Figure 1:
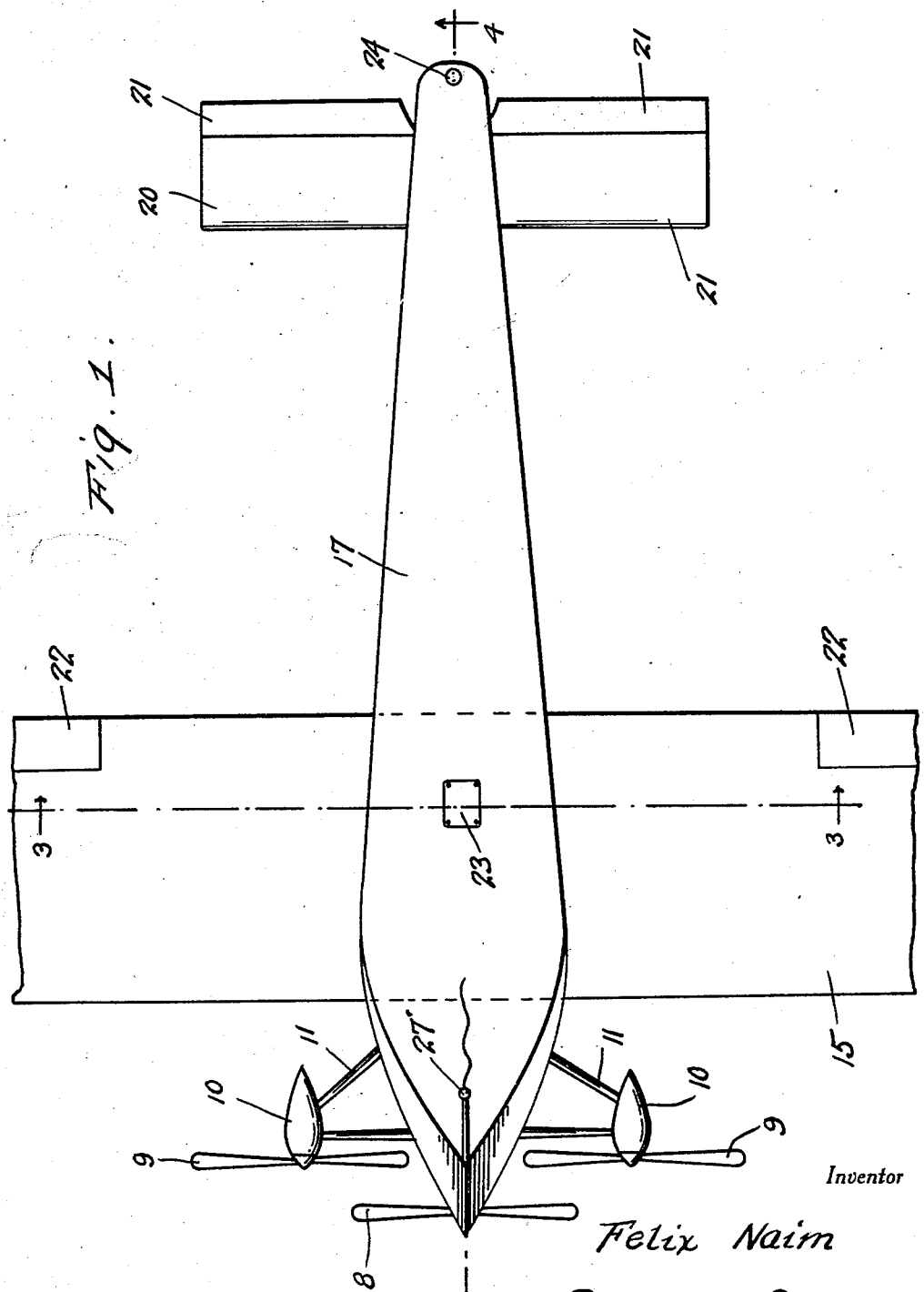

April 14, 1931. F. NAIM 1,800,744
AIRCRAFT
Filed March 5, 1930 4 Sheets-Sheet 2

Inventor
Felix Naim
By Clarence A. O'Brien
Attorney

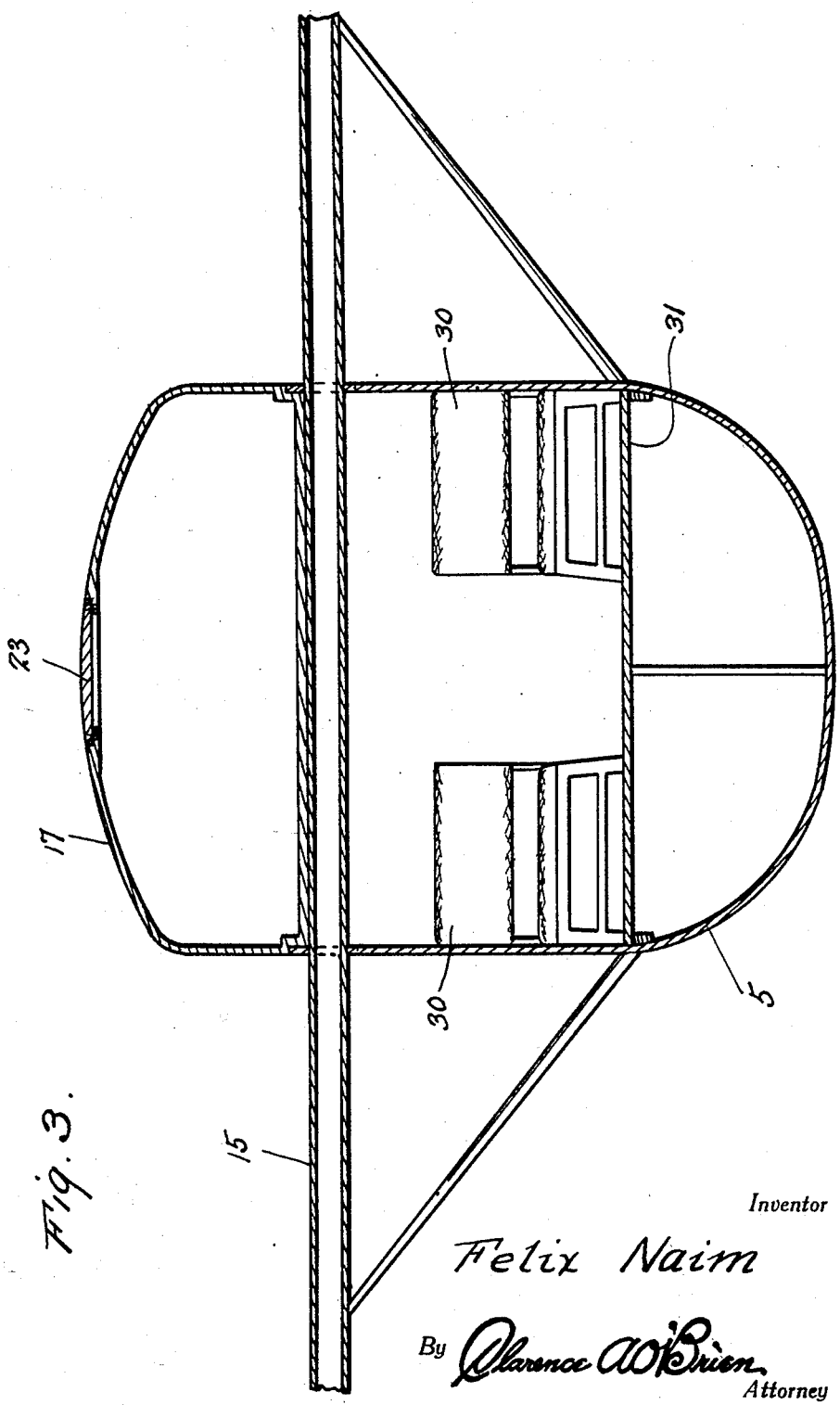

April 14, 1931.    F. NAIM    1,800,744
AIRCRAFT
Filed March 5, 1930    4 Sheets-Sheet 4
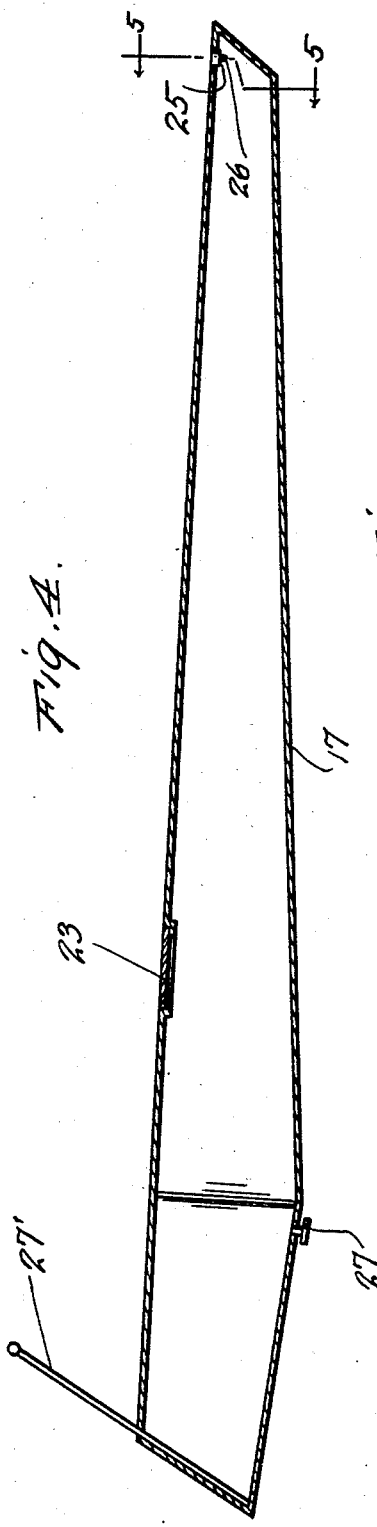
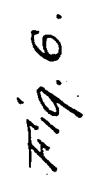
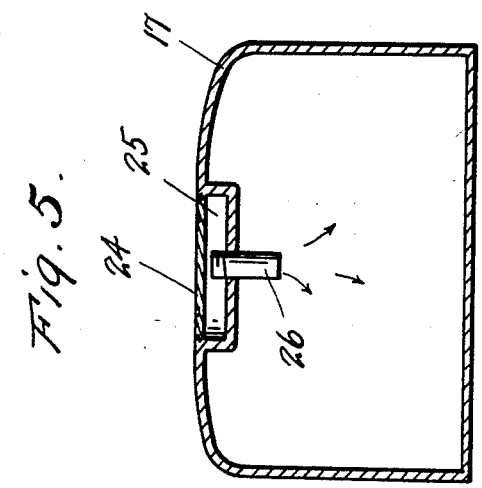
Inventor
Felix Naim
By Clarence A. O'Brien
Attorney Patented Apr. 14, 1931

1,800,744

UNITED STATES PATENT OFFICE

FELIX NAIM, OF DETROIT, MICHIGAN

AIRCRAFT

Application filed March 5, 1930. Serial No. 433,406.

The present invention relates to aircraft and has for its prime object to combine the features of a lighter than air craft with those of a heavier than air craft.

Another very important object of the invention resides in the provision of an aircraft of this nature which is to provide an aircraft which is strong and durable, capable of proper manipulation in the air, possessed of great stability, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
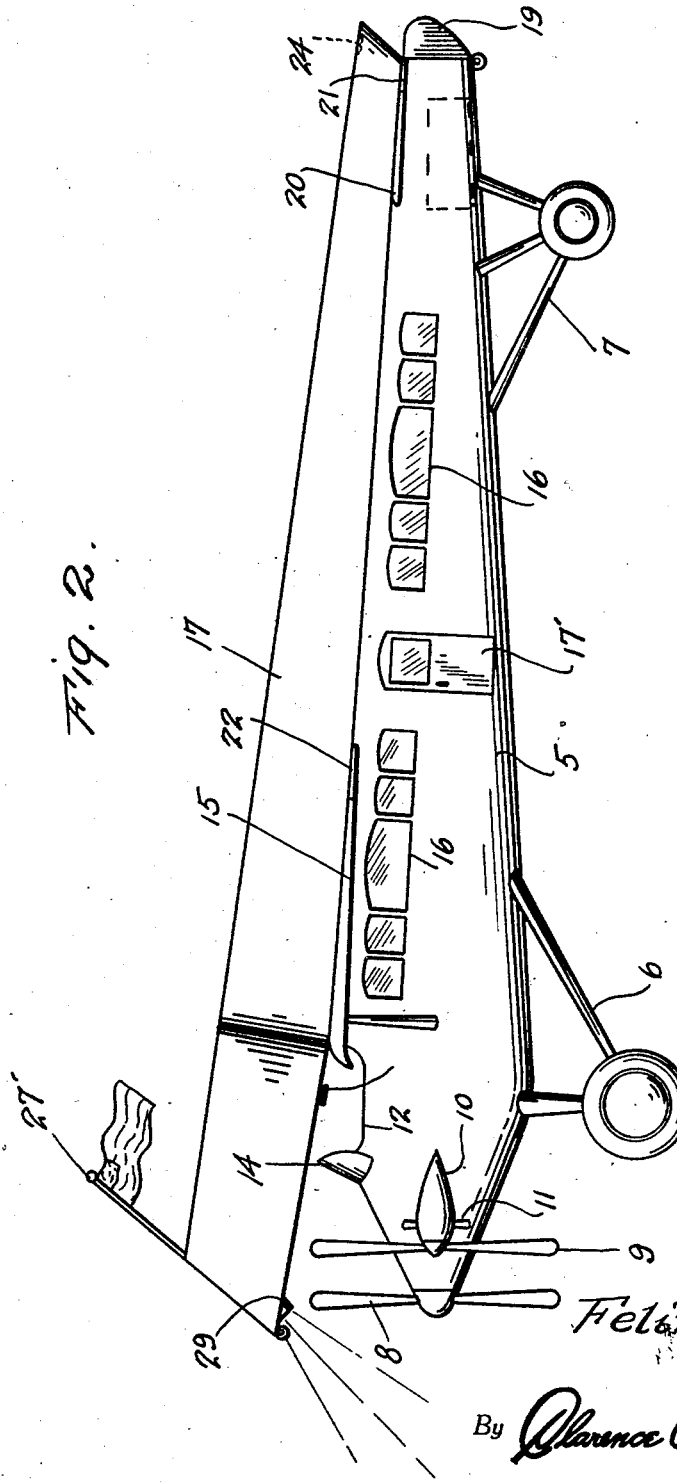

In the drawing:

Figure 1 is a top plan view of the aircraft embodying the features of my invention, Figure 2 is a side elevation thereof, Figure 3 is a vertical transverse section therethrough taken substantially on the line 3—3 of Figure 1, Figure 4 is a vertical longitudinal section through the rigid gas bag container, Figure 5 is a transverse section therethrough taken substantially on the line 5—5 of Figure 6, Figure 6 is a fragmentary plan view showing a portion of the bottom of the gas container having the pressure gauge therein.

Referring to the drawings in detail it will be seen that the numeral 5 denotes an elongated fuselage having front and rear running gears 6 and 7 respectively. On the nose of the fuselage is a propeller 8 and a pair of propellers 9 are provided for prime movers 10 to the sides of the nose being mounted by suitable supports 11 extending laterally therefrom.

The cockpit 12 is in the front of the fuselage and has a suitable shield 14 therefor. The frame 15 extends across the top of the fuselage immediately to the rear of the cockpit 12. Numerous windows 16 are provided in the sides of the fuselage as are also doors 17.

Mounted longitudinally on the top of the fuselage is a stream line boat shaped rigid gas bag or container 17. The wing 15 is hollow so that it may be used as a fuel container or the like. A rudder 19 is provided at rear or tail ends of the fuselage and lateral wings 20 extends from the tail end of the fuselage having elevators 21 on their rear edges.

Ailerons 22 are incorporated in the outer portions of the trailing edge of the wing 15. The gas container 15 is provided with a trap door 23 in the forward intermediate portion of the top thereof.

In the rear portion of the top there is formed a depression closed by a threaded plate 24 and in this depression 25 there is a filling nipple or check valve 26. A pressure gauge 27 is provided in the bottom of the container immediately above the cockpit 12. A flag pole 27 extends up from the nose so that a flag may be mounted on the top thereof as is shown to advantage in Figure 2.

A headlight 28 is mounted in the bottom of the front end of the gas bag or container as is clearly illustrated in Figure 2.

In the fuselage there are a row of seats 30 on each side mounted on the floor 31 and the space below the floor may be used for storage purposes.

It is thought that the construction, utility and advantages of this invention will now be quite apparent to those skilled in this art without a more detailed description thereof.

It will be seen that the air craft embodies both the features of lighter than air craft and heavier than air craft thereby greatly increasing the safety of flying and the capabilities of maneuvering.

The present embodiment of the invention, however, has been disclosed in considerable detail merely for the purpose of exemplification since in actual practice it will attain the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. An aircraft of the class described including an elongated stream line fuselage, an elongated stream line flat-sided boat shaped rigid gas container extending along the top of the fuselage and beyond the ends thereof, and attached to rest thereupon, a wing extending across the fuselage adjacent the forward end thereof and below the container, said fuselage having a cockpit immediately in front of the wing and under the forward portion of the container, propelling means on the nose of the fuselage.

2. An aircraft of the class described including an elongated stream line fuselage, an elongated stream line boat-shaped rigid gas container extending along the top of the fuselage and beyond the ends thereof, and attached thereto, a wing extending across the fuselage adjacent the forward end thereof and below the container, said container comprising a straight convex top wall, depending perpendicular side walls, and a bottom wall secured directly to the top of the fuselage, the end portions of the side walls being converged to close the ends of the container, propelling means on the front of the fuselage.

3. An aircraft of the class described comprising a bullet-nosed rearwardly tapering fuselage having a flat top cut downwardly and forwardly at the nose to provide a cockpit, propelling means at the terminal of the nose and on both sides thereof, a front wing secured across the top of the fuselage next to the rear edge of the cockpit, and a rear wing mounted close to the rear end of the top of the fuselage, and a rigid gas filled container placed directly upon and secured to the flat top of the fuselage and extending at both ends beyond the fuselage, said container having a substantially rectangular cross section, and the front end of the sides of the fuselage being mutually converged to form a vertical forwardly presented edge, and the rear end of the sides of the fuselage joined by an arcuate wall.

4. An aircraft of the type described comprising a bullet-nosed rearwardly tapering straight-sided fuselage having a flat top, and having the top of the nose cut away to provide a cockpit opening, a front wing structure mounted directly in the rear of the cockpit opening and across the top of the fuselage, and a rear wing across the top of the fuselage adjacent the rear end thereof, and a gas container having a substantially rectangular cross section constructed on the flat top of the fuselage and having its straight sides projected in the same plane as the sides of the fuselage.

In testimony whereof I affix my signature.

FELIX NAIM.